United States Patent
Uchihara et al.

(10) Patent No.: US 9,610,934 B2
(45) Date of Patent: Apr. 4, 2017

(54) CONTROL DEVICE OF HYBRID VEHICLE

(75) Inventors: Masafumi Uchihara, Toyota (JP); Tomohiro Usami, Toyota (JP); Mariko Kanai, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 25 days.

(21) Appl. No.: 14/000,706

(22) PCT Filed: Feb. 21, 2011

(86) PCT No.: PCT/JP2011/053745
§ 371 (c)(1),
(2), (4) Date: Aug. 21, 2013

(87) PCT Pub. No.: WO2012/114446
PCT Pub. Date: Aug. 30, 2012

(65) Prior Publication Data
US 2013/0332020 A1    Dec. 12, 2013

(51) Int. Cl.
*B60W 20/00* (2016.01)
*B60W 20/12* (2016.01)
(Continued)

(52) U.S. Cl.
CPC .............. *B60W 20/00* (2013.01); *B60K 6/48* (2013.01); *B60W 10/06* (2013.01); *B60W 10/08* (2013.01);
(Continued)

(58) Field of Classification Search
CPC ......... B60K 6/46; B60W 20/00; B60W 10/06; B60W 50/0097
See application file for complete search history.

(56) References Cited

U.S. PATENT DOCUMENTS

| 2010/0131139 A1 | 5/2010 | Sakai et al. |
| 2010/0185384 A1* | 7/2010 | Naito ............... G01C 21/26 701/532 |
| 2010/0204863 A1* | 8/2010 | Sakamoto et al. ............ 701/22 |

FOREIGN PATENT DOCUMENTS

| JP | 08-331772 | 12/1996 |
| JP | 8-331772 A | 12/1996 |

(Continued)

OTHER PUBLICATIONS

International Search Report Issued May 17, 2011 on PCT/JP11/053745 Filed Feb. 21, 2011.

*Primary Examiner* — Basil T Jos
(74) *Attorney, Agent, or Firm* — Oblon, McClelland, Maier & Neustadt, L.L.P.

(57) ABSTRACT

It is provided a control device of a hybrid vehicle including a plurality of drive power sources for running including an electric motor driven by electric energy of an electric storage device, the hybrid vehicle configured to perform motor running or assist running using the electric motor for running, the control device being configured to divide a running road acquired from map data into a plurality of sections and stores a change amount of a charged capacity of the electric storage device for each of the divided sections, to acquire all possibly-traveled running routes within a predetermined distance from a current position of the vehicle based on the map data, to calculate a variation characteristic of the charged capacity in correlation with a distance from the current position for each of the running routes based on the change amount of the charged capacity, if it is determined from the variation characteristic of the charged capacity that the possibly-traveled running routes include at least one running route in which electric energy can be recovered to the extent exceeding a predetermined charged capacity upper limit value for permitting charging of the electric (Continued)

storage device, permission being given for the motor running or the assist running using a consumable amount of the electric energy based on electric energy exceeding the predetermined charged capacity upper limit value on the condition that the charged capacity does not fall below a predetermined charged capacity lower limit value for permitting discharging of the electric storage device in all the possibly-traveled running routes even when the electric energy exceeding the predetermined charged capacity upper limit value is consumed before recovery.

7 Claims, 11 Drawing Sheets

(51) Int. Cl.

| | | |
|---|---|---|
| *B60K 6/48* | (2007.10) |
| *B60W 10/06* | (2006.01) |
| *B60W 50/00* | (2006.01) |
| *B60W 10/08* | (2006.01) |
| *B60W 10/26* | (2006.01) |
| *B60W 20/10* | (2016.01) |

(52) U.S. Cl.
CPC ............ *B60W 10/26* (2013.01); *B60W 20/10* (2013.01); *B60W 20/12* (2016.01); *B60W 50/0097* (2013.01); B60K 2006/4825 (2013.01); B60W 2550/143 (2013.01); B60W 2550/402 (2013.01); B60W 2600/00 (2013.01); Y02T 10/6221 (2013.01); Y02T 10/6252 (2013.01); Y02T 10/6291 (2013.01); Y02T 10/84 (2013.01); Y02T 10/92 (2013.01); Y10S 903/93 (2013.01)

(56) References Cited

FOREIGN PATENT DOCUMENTS

| | | |
|---|---|---|
| JP | 2002-036903 | 2/2002 |
| JP | 2002-36903 A | 2/2002 |
| JP | 3417389 B2 | 6/2003 |
| JP | 2005-160269 | 6/2005 |
| JP | 2005-160269 A | 6/2005 |
| JP | 2010-125868 | 6/2010 |
| JP | 2010-169423 | 8/2010 |
| JP | 2010-169423 A | 8/2010 |

* cited by examiner

FIG.2(a)

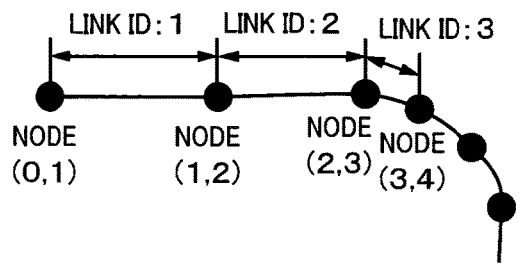

FIG.2(b)

| LINK ID | NODE | | RUNNING ROAD INFORMATION (NAVIGATOR FIXED INFORMATION) |
|---|---|---|---|
| | START POINT | END POINT | |
| 1 | 01 | 12 | ROAD SURFACE GRADIENT: ···[%(°)]<br>ALTITUDE INFORMATION: ···[m]<br>ROAD CURVATURE: ···[1/m]<br>ROAD TYPE: GENERAL ROAD (SUCH AS NATIONAL ROAD / PREFECTURAL ROAD / CITY ROAD / MINOR STREET)<br>OR EXPRESSWAY OR ONE-WAY ROAD<br>ROAD WIDTH INFORMATION<br>INTERSECTION INFORMATION<br>⋮ |
| 2 | 12 | 23 | ⋮ |
| 3 | 23 | 34 | ⋮ |
| ⋮ | ⋮ | ⋮ | ⋮ |

| SECTION ID | DIVIDED SECTION | | ΔSOC[%] | NUMBER OF TIMES OF RUNNING [TIMES] |
|---|---|---|---|---|
| | START POINT | END POINT | | |
| 1 | BRANCH POINT A | BRANCH POINT B | ±0 | 10 |
| 2 | BRANCH POINT B | DIVISION POINT A | −2 | 5 |
| 3 | DIVISION POINT A | DIVISION POINT B | −2 | |
| 4 | DIVISION POINT B | DIVISION POINT C | −1 | |
| 5 | DIVISION POINT C | DIVISION POINT D | +3 | |
| 6 | DIVISION POINT D | DIVISION POINT E | +3 | |
| 7 | DIVISION POINT E | BRANCH POINT C | +1 | |
| 8 | BRANCH POINT C | BRANCH POINT D | −1 | 1 |
| ⋮ | ⋮ | ⋮ | ⋮ | ⋮ |

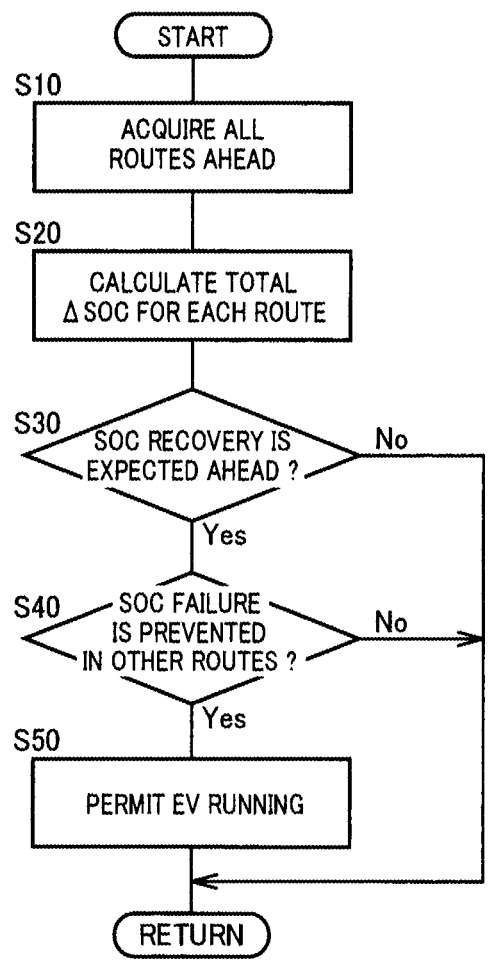

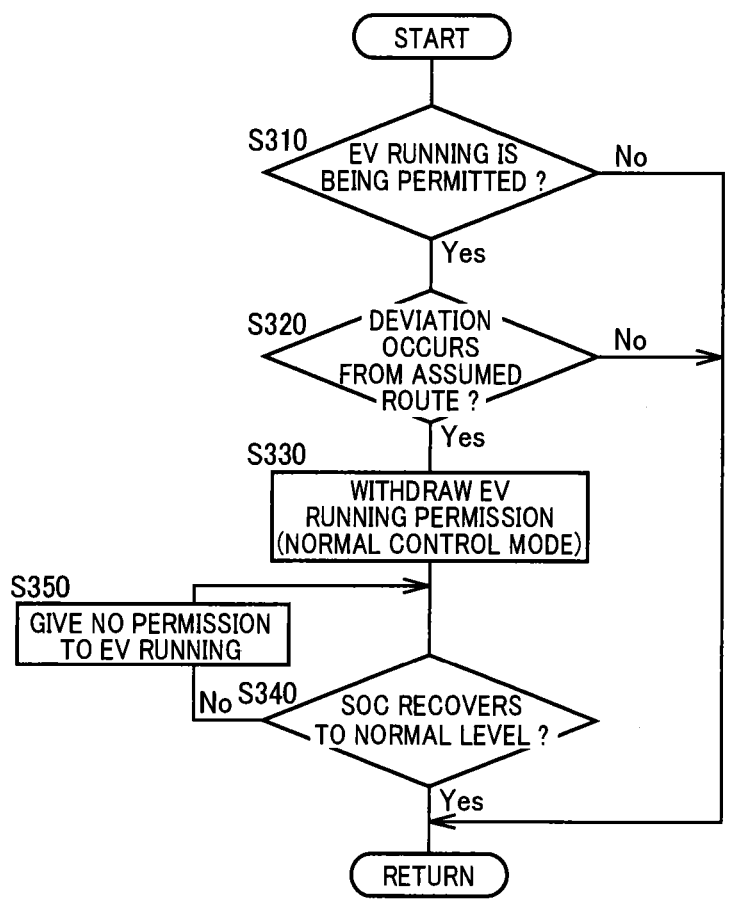

CONTROL DEVICE OF HYBRID VEHICLE

TECHNICAL FIELD

The present invention relates to a control device of a hybrid vehicle including a plurality of drive power sources for running including an electric motor driven by electric energy of an electric storage device.

BACKGROUND ART

A hybrid vehicle is well known that includes a plurality of drive power sources for running including an electric motor driven by electric energy of an electric storage device and that is capable of running using the electric motor (e.g., motor running or assist running). For example, this corresponds to hybrid vehicles described in Patent Documents 1 and 2. Such a hybrid vehicle generally has a charged capacity (state of charge; SOC) of an electric storage device controlled to be maintained within a predetermined range (e.g., a range of an SOC management width defined by an upper limit value and a lower limit value) so as to suppress deterioration in durability of the electric storage device due to repeated charging/discharging. Therefore, the electric motor is caused to perform power running operation or regenerative operation within the limited SOC. From another viewpoint, the availability of the motor running or the assist running can be determined based on SOC information of the electric storage device. Patent Document 1 discloses a technique of calculating a boundary of a travelable range in which a vehicle can run by the motor running based on a current position based on map information, an SOC value of a battery, and learning data based on running history (an energy amount required for the vehicle running on each link in which the vehicle ran in the past) to display and overlap the boundary on a map displayed on a display.

PRIOR ART DOCUMENTS

Patent Documents

Patent Document 1: Japanese Laid-Open Patent Publication No. 2010-169423
Patent Document 2: Japanese Laid-Open Patent Publication No. 2005-160269

SUMMARY OF THE INVENTION

Problem to be Solved by the Invention

However, in the technique described in Patent Document 1, since no consideration is given to a recovered amount of electric energy (regenerative energy) from regenerative operation during running, the accuracy (credibility) of the travelable range may be reduced. A technique with a consideration given to a recovered amount of regenerative energy from an electric motor is proposed in Patent Document 2 as, if a down-slope section enabling recovery of large regenerative energy is present on a running route such as when a mountain is crossed, enlarging an SOC management width and driving the electric motor to assist an engine to lower the SOC before running the down slope section. However, in the technique described in Patent Document 2, since one running route must be specified from a current point and a running direction and no consideration is given to a plurality of running routes when a branched road etc., are present, electric failure may occur due to the driving of the electric motor in the case of going to a running route different from the specified running route. The problem as described above is not known and no proposal has been made on enabling the motor running and the assist running causing no electric failure without specifying one running route.

The present invention was conceived in view of the situations and it is therefore an object of the present invention to provide a control device of a hybrid vehicle capable of improving fuel efficiency by enabling the motor running and the assist running causing no electric failure without specifying one running route.

Means for Solving the Problem

To achieve the object, the first aspect of the invention provides (a) a control device of a hybrid vehicle including a plurality of drive power sources for running including an electric motor driven by electric energy of an electric storage device, the hybrid vehicle configured to perform motor running or assist running using the electric motor for running, characterized in that (b) the control device divides a running road acquired from map data into a plurality of sections and stores a change amount of a charged capacity of the electric storage device for each of the divided sections.

Effects of the Invention

Consequently, since a running road acquired from the map data is divided into a plurality of sections and the change amount of the charged capacity of the electric storage device is stored for each of the divided sections, an electric energy amount of the electric storage device consumable before recovery of electric energy can be calculated during running in a certain running route based on the change amount of the charged capacity of the stored electric storage device. By consuming the electric energy amount in advance through the motor running and the assist running, a subsequently recovered electric energy amount (regenerative energy amount) can be increased. As a result, the motor running and the assist running causing no electric failure can be achieved without specifying one running route so as to improve fuel efficiency.

The second aspect of the invention provides the control device of the hybrid vehicle recited in the first aspect of the invention, wherein the control device acquires all possibly-traveled running routes within a predetermined distance from a current position of the vehicle based on the map data, wherein the control device calculates a variation characteristic of the charged capacity in correlation with a distance from the current position for each of the running routes based on the change amount of the charged capacity, wherein if it is determined from the variation characteristic of the charged capacity that the possibly-traveled running routes include at least one running route in which electric energy can be recovered to the extent exceeding a predetermined charged capacity upper limit value for permitting charging of the electric storage device, permission is given for the motor running or the assist running using a consumable amount of the electric energy based on electric energy exceeding the predetermined charged capacity upper limit value on the condition that the charged capacity does not fall below a predetermined charged capacity lower limit value for permitting discharging of the electric storage device in all the possibly-traveled running routes even when the electric energy exceeding the predetermined charged capacity upper limit value is consumed before recovery. Consequently, a subsequently recovered regenerative energy amount can be increased by consuming the electric energy amount in advance through the motor running and the assist running. As a result, the motor running and the assist running causing no electric failure can be achieved without specifying one running route so as to improve fuel efficiency.

The third aspect of the invention provides the control device of the hybrid vehicle recited in the second aspect of the invention, wherein if the running is performed in a route other than the possibly-traveled running routes, the permission for the motor running or the assist running is withdrawn. Consequently, although the running is performed on other than the possibly-traveled running routes after the permission for the motor running or the assist running and the charged capacity of the electric storage device may fall below the predetermined charged capacity lower limit value because the electric energy amount is consumed in advance by the motor running or the assist running, the permission for the motor running or the assist running is withdrawn and, therefore, electric failure is avoided even if the expected regenerative energy amount becomes unable to be recovered. As a result, appropriate running can be continued.

The fourth aspect of the invention provides the control device of the hybrid vehicle recited in the second or third aspect of the invention, wherein the possibly-traveled running routes are made up of sections with the change amount of the charged capacity stored. As a result, the variation characteristic of the charged capacity is appropriately calculated for each of the running routes to appropriately determine from the variation characteristic of the charged capacity whether the possibly-traveled running routes include at least one running route in which the electric energy can be recovered to the extent exceeding the predetermined charged capacity upper limit value and to appropriately determine from the variation characteristic of the charged capacity whether the predetermined charged capacity lower than the lower limit value is avoided in all the possibly-traveled running routes even if the electric energy exceeding the predetermined charged capacity upper limit value is consumed before the recovery.

The fifth aspect of the invention provides the control device of the hybrid vehicle recited in any one of inventions the first to fourth aspects of the invention, wherein the sections are divided based on a branch point at which a branched road of the running road starts. Consequently, the running road acquired from the map data is appropriately divided into a plurality of sections.

BRIEF DESCRIPTION OF THE DRAWINGS

FIG. 2 is a conceptual diagram of an example of the contents stored in the storage medium of navigation system.

FIG. 5 is a flowchart for explaining a main portion of the control operation of the electronic control device, i.e., a control operation for enabling the motor running and the assist running causing no electric failure without specifying one running route so as to improve fuel efficiency.

FIG. 11 is a flowchart for explaining a main portion of the control operation of the electronic control device 100, i.e., a control operation for avoiding electric failure when electric energy cannot be recovered as expected.

MODE FOR CARRYING OUT THE INVENTION

Figure 1:
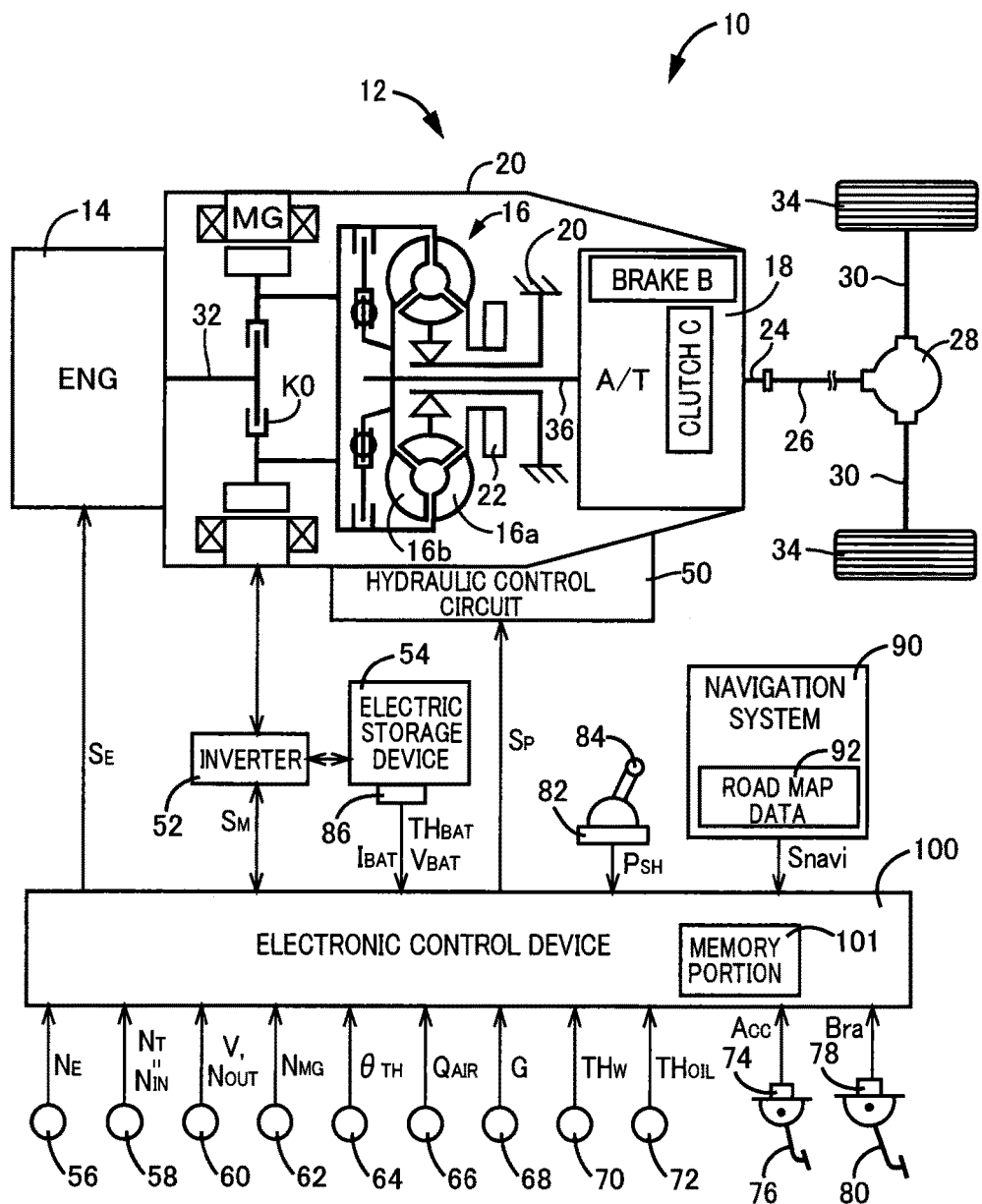
FIG. 1 is a diagram for explaining a general configuration of a power transmission path making up a hybrid vehicle to which the present invention is applied, and is a diagram for explaining a main portion of a control system disposed on the vehicle.

In the present invention, preferably, the possibly-traveled running routes are acquired excluding a branch destination of a road type (road attribute) having a difference equal to or greater than a predetermined amount from a branch source. The possibly-traveled running routes are acquired excluding a branch destination having running history equal to or less than a predetermined amount. The possibly-traveled running routes are acquired excluding a branch destination in a direction taken in the case of traveling to the branch destination causing a difference equal to or greater than a predetermined amount from a current vehicle traveling direction. As a result, all the possibly-traveled running routes can be included while excluding from candidates a route having a low probability of running due to a road type of a branched road ahead, a route having a low probability of running due to past running history, and/or a route in a direction that is not an approximate traveling direction, and a calculation load can be reduced when the possibly-traveled running routes are acquired, when a variation characteristic of a charged capacity is subsequently calculated, and when determinations are made in relation to the determination on whether the motor running or the assist running using the consumable amount is permitted.

Preferably, when the motor running or the assist running using a consumable amount is permitted and the motor running or the assist running is being performed, if an actual charged capacity of the electric storage device is close to and within a predetermined capacity difference from the predetermined charged capacity lower limit value, the predetermined charged capacity lower limit value is temporarily made smaller on the condition that the charged capacity subsequently increases in the currently traveling running route. As a result, in a location (running route) essentially having a sufficient probability of subsequent recovery of electric energy, a charged capacity may fall below an existing predetermined charged capacity lower limit value due to variations of running status etc., and control may be provided to forcibly charge the electric storage device, resulting in deterioration of fuel efficiency; however, since the predetermined charged capacity lower limit value is temporarily lowered, the motor running or the assist running is continued and the fuel efficiency can be improved by the subsequent recovery of electric energy.

Preferably, the sections are divided based on a change amount of a road surface gradient and/or a change amount of altitude in addition to the branch points. As a result, a running road acquired from map data is more appropriately divided into a plurality of sections in accordance with a change trend of a charged capacity of the electric storage device.

Preferably, the hybrid vehicle includes an engine and the electric motor as drive power sources for running, and a transmission transmitting at least power from the engine toward drive wheels. The hybrid vehicle may also include a clutch connecting/disconnecting a power transmission path between the engine and the drive wheels. Such a hybrid vehicle can perform the engine running (hybrid running) using at least the engine as the drive power source for running with the clutch engaged if the clutch is included, and the motor running using only the electric motor as the drive power source for running with the clutch released if the clutch is included. During the engine running, the assist running using the electric motor can be performed by adding the power of the electric motor to the power of the engine for running.

Alternatively and preferably, the hybrid vehicle includes a so-called electric continuously variable transmission having a differential mechanism coupled to an engine in a power transmittable manner and a differential electric motor coupled to the differential mechanism in a power transmittable manner such that the differential state of the differential mechanism is controlled by controlling an operating state of the differential electric motor, and an electric motor for running coupled to an output rotating member of the electric continuously variable transmission in a power transmittable manner. Therefore, the hybrid vehicle includes an electric continuously variable transmission that includes a differential mechanism distributing the power from the engine to a first electric motor and an output rotating member, and a second electric motor disposed on the output rotating member of the differential mechanism and that mechanically transmits a main portion of the power from the engine toward drive wheels by using a differential action of the differential mechanism while electrically transmitting the remainder of the power from the engine by using an electric path from the first electric motor to the second electric motor, thereby electrically changing a gear ratio.

Preferably, the transmission is made up of a single transmission, a transmission having a hydraulic power transmission device such as a torque converter, or a transmission having a sub-transmission. The transmission is made up of a known planetary gear automatic transmission, a known synchromesh parallel two-shaft manual transmission, a known synchromesh parallel two-shaft automatic transmission, a so-called DCT (Dual Clutch Transmission), i.e., a transmission that is a synchromesh parallel two-shaft automatic transmission of a type having two systems of input shafts, a known belt type continuously variable transmission, a known traction type continuously variable transmission, etc.

Preferably, the clutch connecting/disconnecting the power transmission path between the engine and the drive wheels is implemented by using a wet or dry engagement device.

An example of the present invention will now be described in detail with reference to the drawings.

FIRST EXAMPLE

FIG. 1 is a diagram for explaining a general configuration of a power transmission path from an engine 14 to drive wheels 34 making up a hybrid vehicle 10 (hereinafter referred to as a vehicle 10) to which the present invention is applied, and is a diagram for explaining a main portion of a control system disposed on the vehicle 10 for output control of the engine 14 acting as a drive power source for running, shift control of an automatic transmission 18, drive control of an electric motor MG acting as a drive power source for running, running-road sectionalizing control utilizing a navigation system 90, etc.

In FIG. 1, a vehicle power transmission device 12 (hereinafter referred to as a power transmission device 12) includes an engine connecting/disconnecting clutch K0, the electric motor MG a torque converter 16, an oil pump 22, the automatic transmission 18, etc., in this order from the engine 14 side in a transmission case 20 (hereinafter referred to as a case 20) acting as a non-rotating member attached to a vehicle body by bolts etc. The power transmission device 12 also includes a propeller shaft 26 coupled to an output shaft 24 that is an output rotating member of the automatic transmission 18, a differential gear device (differential gear) 28 coupled to the propeller shaft 26, a pair of axles 30 coupled to the differential gear device 28, etc. The power transmission device 12 configured as described above is preferably used in the vehicle 10 of the FR (front-engine rear-drive) type, for example. In the power transmission device 12, if the engine connecting/disconnecting clutch K0 is engaged, the power of the engine 14 is transmitted from an engine coupling shaft 32 coupling the engine 14 and the engine connecting/disconnecting clutch K0, sequentially through the engine connecting/disconnecting clutch K0, the torque converter 16, the automatic transmission 18, the propeller shaft 26, the differential gear device 28, a pair of the axles 30, etc., to a pair of the drive wheels 34.

The torque converter 16 is a hydraulic power transmission device transmitting a drive power input to a pump impeller 16a via fluid toward the automatic transmission 18. The pump impeller 16a is coupled sequentially through the engine connecting/disconnecting clutch K0 and the engine coupling shaft 32 to the engine 14 and is an input-side rotating element receiving the input of the drive power from the engine 14 and rotatable around an axial center. A turbine impeller 16b of the torque converter 16 is an output-side rotating element of the torque converter 16 and is relatively non-rotatably coupled to a transmission input shaft 36 that is an input rotating member of the automatic transmission 18 by the spline fitting, etc.

The electric motor MG is a so-called motor generator having a function as a motor generating a mechanical drive power from electric energy and a function of an electric generator generating electric energy from mechanical energy. In other words, the electric motor MG may act as a power source for running driven by electric energy supplied via an inverter 52 from an electric storage device 54 to generate a drive power for running instead of the engine 14 or along with the engine 14. The electric motor MG performs operations such as generating electric energy through regeneration from a drive power generated by the engine 14 or a driven power (mechanical energy) input from the side of the drive wheels 34 to accumulate the electric energy via the inverter 52 into the electric storage device 54. The electric motor MG is operatively coupled to the pump impeller 16a and power is mutually transmitted between the electric motor MG and the pump impeller 16a. Therefore, the electric motor MG is coupled to the transmission input shaft 36 in a power transmittable manner as is the case with the engine 14.

The oil pump 22 is a mechanical oil pump coupled to the pump impeller 16*a* and rotationally driven by the engine 14 (or the electric motor MG) to generate an operating oil pressure for providing the shift control of the automatic transmission 18, controlling engagement/release of the engine connecting/disconnecting clutch K0, and supplying lubricant oil to the portions of the power transmission path of the vehicle 10.

The engine connecting/disconnecting clutch K0 is a wet multi-plate type hydraulic friction engagement device in which a plurality of friction plates overlapped with each other is pressed by a hydraulic actuator, for example, and is subjected to engagement/release control by a hydraulic control circuit 50 disposed in the power transmission device 12 by using an oil pressure generated by the oil pump 22 as an original pressure. In the engagement/release control, a power-transmittable torque capacity of the engine connecting/disconnecting clutch K0, i.e., an engagement force of the engine connecting/disconnecting clutch K0 is varied, for example, continuously, through pressure adjustment of a linear solenoid valve etc., in the hydraulic control circuit 50. The engine connecting/disconnecting clutch K0 includes a pair of clutch rotating members (a clutch hub and a clutch drum) relatively rotatable in the released state thereof and one of the clutch rotating members (the clutch hub) is relatively non-rotatably coupled to the engine coupling shaft 32 while the other clutch rotating member (the clutch drum) is relatively non-rotatably coupled to the pump impeller 16*a* of the torque converter 16. Because of such a configuration, the engine connecting/disconnecting clutch K0 rotates the pump impeller 16*a* integrally with the engine 14 via the engine coupling shaft 32 in the engaged state. Therefore, in the engaged state of the engine connecting/disconnecting clutch K0, the drive power from the engine 14 is input to the pump impeller 16*a*. On the other hand, in the released state of the engine connecting/disconnecting clutch K0, the power transmission between the pump impeller 16*a* and the engine 14 is interrupted. Since the electric motor MG is operatively coupled to the pump impeller 16*a* as described above, the engine connecting/disconnecting clutch K0 acts as a clutch connecting/disconnecting the power transmission path between the engine 14 and the electric motor MG.

The automatic transmission 18 is coupled to the electric motor MG in a power transmittable manner without passing through the engine connecting/disconnecting clutch K0 to make up a portion of the power transmission path from the engine 14 to the drive wheels 34 and transmits the power from the drive power source for running (the engine 14 and the electric motor MG) toward the drive wheels 34. The automatic transmission 18 is a planetary-gear type multi-stage transmission acting as a stepped automatic transmission shifted to selectively establish a plurality of shift stages (gear stages) by switching any of a plurality of hydraulic friction engagement devices such as a clutch C and a brake B to be gripped (i.e., by engagement and release of the hydraulic friction engagement devices), for example. Therefore, the automatic transmission 18 is a stepped transmission performing a so-called clutch-to-clutch shift frequently used in known vehicles and changes the speed of the rotation of the transmission input shaft 36 to output the rotation from the output shaft 24. The transmission input shaft 36 is a turbine shaft rotationally driven by the turbine impeller 16*b* of the torque converter 16. The automatic transmission 18 has a predetermined gear stage (shift stage) established depending on accelerator operation of a driver, a vehicle speed V, etc., through the engagement/release control of each of the clutch C and the brake B.

The navigation system 90 includes a storage medium 92 such as a CD-ROM, a DVD-ROM, and an HDD (hard disk drive), for example, and has a function of providing known navigation control by using a road map database (hereinafter referred to as map data) stored in the storage medium 92. FIG. 2 is a conceptual diagram of an example of the map data stored in the storage medium 92. In FIG. 2, (a) is a diagram of a plurality of nodes that are arbitrary points specified by the map data and links that are multiple section connecting the nodes specified by the map data, and (b) is a diagram of a data table of running road information etc., stored for each link. As depicted in FIG. 2, an ID address (link ID) is determined for each link to store start-point and end-point coordinates defined by nodes and a road surface gradient, altitude information, road curvature, a road type such as a general road (such as a national road, a prefectural road, a city road, and a minor street), an expressway, and a one-way road, road width information, and intersection information as running road information (road information) for each link ID. Although the map data such as nodes, link IDs, and running road information stored in the storage medium 92 is, for example, normally non-rewritable fixed information, the map data can be updated by replacing the medium such as a CD-ROM and a DVD-ROM or by rewriting contents of an HDD by using update software.

Returning to FIG. 1, the vehicle 10 includes an electronic control device 100 including a control device related to hybrid drive control, for example. The electronic control device 100 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 100 provides the output control of the engine 14, the drive control of the electric motor MG including regenerative control of the electric motor MG, the shift control of the automatic transmission 18, the torque capacity control of the engine connecting/disconnecting clutch K0, etc., and is configured separately for the engine control, the electric motor control, the hydraulic control (shift control), etc., as needed.

The electronic control device 100 is supplied with, for example, a signal indicative of an engine rotation speed $N_E$ that is the rotation speed of the engine 14 detected by an engine rotation speed sensor 56; a signal indicative of a turbine rotation speed $N_T$ of the torque converter 16 as an input rotation speed of the automatic transmission 18 detected by a turbine rotation speed sensor 58, i.e., a transmission input rotation speed $N_{IN}$ that is the rotation speed of the transmission input shaft 36; a signal indicative of a transmission output rotation speed $N_{OUT}$ that is the rotation speed of the output shaft 24 corresponding to the vehicle speed V or a rotation speed of the propeller shaft 26 as a vehicle speed related value detected by an output shaft rotation speed sensor 60; a signal indicative of an electric motor rotation speed $N_{MG}$ that is the rotation speed of the electric motor MG detected by an electric motor rotation speed sensor 62; a signal indicative of a throttle valve opening degree $\theta_{TH}$ that is an opening degree of an electronic throttle valve not depicted detected by a throttle sensor 64; a signal indicative of an intake air amount $Q_{AIR}$ of the engine 14 detected by an intake air amount sensor 66; a signal indicative of longitudinal acceleration G (or longitudinal deceleration G) of the vehicle 10 detected by an acceleration sensor 68; a signal indicative of a cooling water temperature $TH_W$ of the engine 14 detected by a cooling water temperature sensor 70; a signal indicative of an oil temperature $TH_{OIL}$ of the operating oil in the hydraulic control circuit 50 detected by an oil temperature sensor 72; a signal indicative of an accelerator opening degree Acc that is an operation amount of an accelerator pedal 76 as a drive power request amount (driver request output) for the vehicle 10 from a driver detected by an accelerator opening degree sensor 74; a signal indicative of a brake operation amount Bra that is an operation amount of a brake pedal 80 as a braking power request amount (driver request deceleration) for the vehicle 10 from a driver detected by a foot brake sensor 78; a signal indicative of a lever position (a shift operation position, a shift position, an operation position) $P_{SH}$ of a shift lever 84, such as known "P", "N", "D", "R", and "S" positions, detected by a shift position sensor 82; signals indicative of a battery temperature $TH_{BAT}$, a battery input/output current (battery charging/discharging current) $I_{BAT}$, and a battery voltage $V_{BAT}$ of the electric storage device 54 detected by a battery sensor 86; and a car navigation information signal Snavi indicative of map data from the navigation system 90 mounted on the vehicle 10. The electronic control device 100 sequentially calculates the state of charge (charged capacity) SOC of the electric storage device 54 based on the battery temperature $TH_{BAT}$, the battery charging/discharging current $I_{BAT}$, and the battery voltage $V_{BAT}$, for example.

The electronic control device 100 outputs, for example, an engine output control command signal $S_E$ for the output control of the engine 14; an electric motor control command signal $S_M$ for controlling the operation of the electric motor MG; and an oil pressure command signal $S_P$ for actuating electromagnetic valves (solenoid valves) etc., included in the hydraulic control circuit 50 for controlling hydraulic actuators of the engine connecting/disconnecting clutch K0 and the clutch C and the brake B of the automatic transmission 18.

Figure 3:
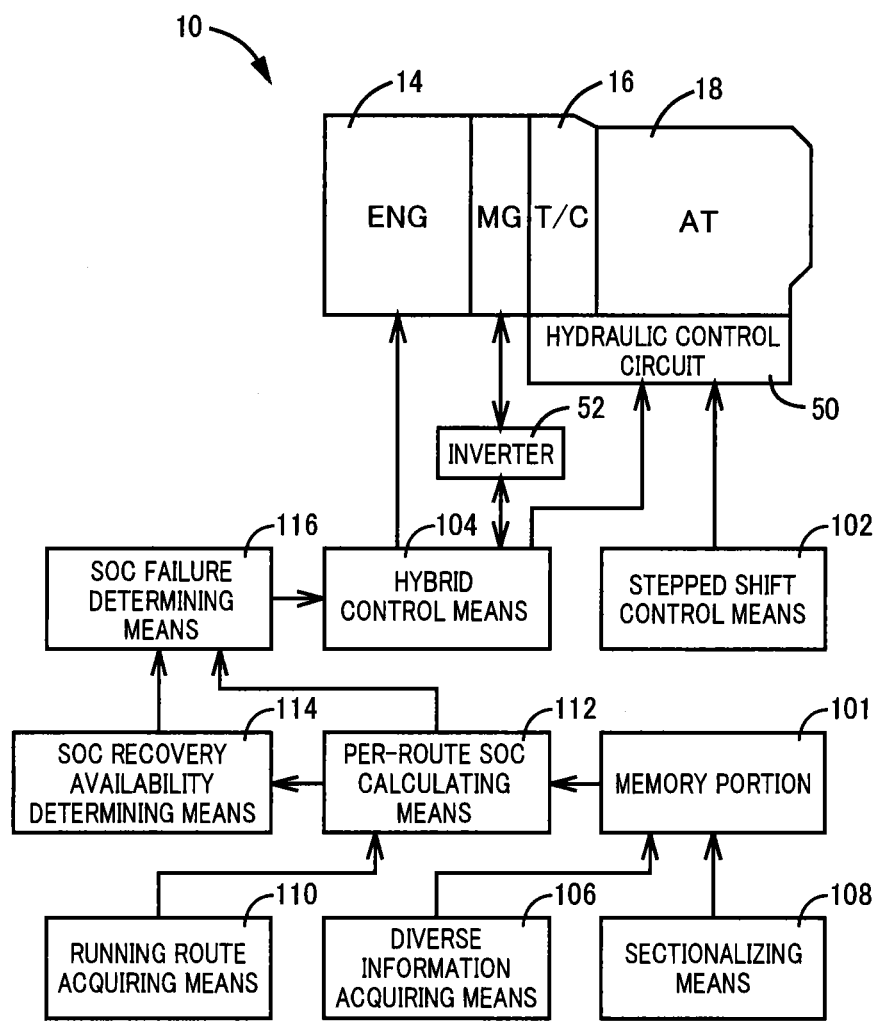
FIG. 3 is a functional block diagram for explaining a main portion of the control function of the electronic control device.

FIG. 3 is a functional block diagram for explaining a main portion of the control function of the electronic control device 100. In FIG. 3, a stepped shift control portion, i.e., a stepped shift control means 102 acts as a shift control means performing a shift of the automatic transmission 18. For example, the stepped shift control means 102 makes a shift determination based on a vehicle state indicated by the actual vehicle speed V and the accelerator opening degree Acc from known relationship (shift diagram, shift map) using the vehicle speed V and the accelerator opening degree Acc (or transmission output torque $T_{OUT}$ etc.) as variables, and outputs the oil pressure command signal $S_P$ for providing the automatic shift control of the automatic transmission 18 such that the determined shift stage is acquired.

A hybrid control portion, i.e., a hybrid control means 104 has a function as an engine drive control means controlling the drive of the engine 14 and a function as an electric motor operation control means controlling the operation of the electric motor MG as a drive power source or an electric generator through the inverter 52, and provides control of the hybrid drive by the engine 14 and the electric motor MG etc., through these control functions. For example, the hybrid control means 104 calculates a vehicle request torque, i.e., a target value of a drive torque $T_D$ (target drive torque $T_D^*$) that is a torque on the axles 30 (output torque at the drive wheels 34) based on the accelerator opening degree Acc and the vehicle speed V, calculates an output torque of the drive power source for running (the engine 14 and the electric motor MG), i.e., a target value of the transmission input torque $T_{AT}$ (target transmission input torque $T_{AT}^*$) for acquiring the target drive torque $T_D^*$ in consideration of a transmission loss, an accessory load, a shift stage of the automatic transmission 18, a charged capacity SOC of the electric storage device 54 (in other words, a charging/discharging request amount of the electric storage device 54), etc., and controls the drive power source for running so as to achieve the target transmission input torque $T_{AT}^*$.

More specifically, for example, if the target drive torque $T_D^*$ (target transmission input torque $T_{AT}^*$) is within a range that can be covered by only an electric motor torque $T_{MG}$, the hybrid control means 104 sets a running mode to a motor running mode (hereinafter, EV mode) and performs the motor running (EV running) using only the electric motor MG as the drive power source for running. On the other hand, for example, if the target drive torque $T_D^*$ is within a range that cannot be covered unless at least the engine torque $T_E$ is used, the hybrid control means 104 sets the running mode to an engine running mode, i.e., a hybrid running mode (hereinafter, HV mode) and performs the engine running, i.e., the hybrid running (HV running) using at least the engine 14 as the drive power source for running.

If the HV running is performed, the hybrid control means 104 engages the engine connecting/disconnecting clutch K0 to transmit the drive power from the engine 14 to the pump impeller 16a and performs the assist running in which the electric motor MG is caused to output an assist torque for running as needed. On the other hand, if the EV running is performed, the hybrid control means 104 releases the engine connecting/disconnecting clutch K0 to interrupt the power transmission path between the engine 14 and the torque converter 16 and causes the electric motor MG to output the electric motor torque $T_{MG}$ for the EV running.

If the target drive torque $T_D^*$ is increased due to an additional depression operation of the accelerator pedal 76 during the EV running and the target transmission input torque $T_{AT}^*$ corresponding to the target drive torque $T_D^*$ exceeds a predetermined EV running torque range obtained and defined in advance as torque that can be accommodated by the electric motor torque $T_{MG}$, the hybrid control means 104 switches the running mode from the EV mode to the HV mode and starts the engine 14 to perform the HV running. On the other hand, if the target drive torque $T_D^*$ is reduced due to an depression returning operation of the accelerator pedal 76 during the HV running and the target transmission input torque $T_{AT}^*$ falls within the predetermined EV running torque range, the hybrid control means 104 switches the running mode from the HV mode to the EV mode and stops the engine 14 to perform the EV running.

The charged capacity SOC of the electric storage device 54 is controlled to be maintained within a range of an SOC management width obtained and set in advance as a predetermined range for suppressing deterioration in durability of the electric storage device 54 repeating charging and discharging. The SOC management width has a range thereof defined by, for example, a management width upper limit value that is a predetermined charged capacity upper limit value obtained and set in advance as an upper limit value of the charged capacity SOC at which the charging of the electric storage device 54 is permitted, and a management width lower limit value that is a predetermined charged capacity lower limit value obtained and set in advance as a lower limit value of the charged capacity SOC at which the discharging of the electric storage device 54 is permitted. Therefore, even in a running state in which electric energy (regenerative energy) can be recovered through the regenerative operation of the electric motor MG; an amount of energy exceeding the SOC management width (management width upper limit value) cannot be recovered as the regenerative energy and is consumed and discarded as other braking torque of a wheel brake, an engine brake, etc., other than a regenerative brake. As a result, a regenerative energy amount cannot be increased despite the running state in which the regenerative energy can be recovered, and fuel efficiency cannot be improved.

In this regard, if it is known in advance that a running state occurs in which the regenerative energy is partially unrecoverable and discarded, it is conceivable for recovery of a discarded energy portion as the regenerative energy that an electric energy amount corresponding to the energy portion is consumed in advance by the EV running or the assist running so as to reduce the charged capacity SOC of the electric storage device 54. However, the occurrence of the running state enabling the recovery of the regenerative energy cannot be known in advance unless one running route is specified. If a deviation from the specified running route occurs during running, the electric energy amount consumed in advance cannot be recovered, possibly resulting in electric failure. Therefore, in this example, a method is proposed that enables the EV running and the assist running causing no electric failure without specifying one running route so as to improve fuel efficiency. The method will hereinafter be described in detail.

A diverse information acquiring portion, i.e., a diverse information acquiring means 106 acquires current position information and vehicle traveling direction information of the vehicle 10 matched with a map by the navigation system 90 on a road map in the map data stored in the storage medium 92 based on positional information detected by using a positioning system utilizing artificial satellites such as a known GPS (global positioning system) and positional information detected by using a known INS (inertial navigation system).

A sectionalizing portion, i.e., a sectionalizing means 108 divides a running road acquired from the map data stored in the storage medium 92 into a plurality of sections and stores the divided sections into a memory portion 101 in the electronic control device 100. For example, the sectionalizing means 108 sectionalizes a running road on the road map in the map data corresponding to the currently traveling running road by defining a running road to a branch point at which a branched road of the running road exists as one section, to which an ID address (section ID) is assigned, based on the intersection information in the map data. The sectionalization (division into sections) based on the branch point hardly reflects a difference in road surface gradient θ having a tendency to affect a change amount of the charged capacity SOC of the electric storage device 54 (hereinafter, a charged capacity change amount ΔSOC). Therefore, the sectionalizing means 108 also performs the sectionalization depending on a change amount of the road surface gradient θ and a change amount of altitude H based on the road surface gradient and the altitude information in the map data. For example, if no road surface gradient is stored as the map data, the electronic control device 100 may calculate the road surface gradient θ each time based on the altitude information etc. For example, if the road surface gradient and the altitude information are not stored as the map data, the electronic control device 100 may calculate the road surface gradient θ (=a sin((dV/dt−G)/g)) based on the vehicle speed V, the longitudinal acceleration G, and the gravitational acceleration g.

The diverse information acquiring means 106 also acquires the current (actual) charged capacity SOC of the electric storage device 54. The diverse information acquiring means 106 acquires an actual measurement value of the charged capacity change amount ΔSOC for each of a plurality of sections divided by the sectionalizing means 108 based on the charged capacity SOC and stores the actual measurement value in connection (correlation) with the section ID for each section into the memory portion 101. If the same section is traveled many times, a statistical process (e.g., calculation of an average value) may be executed before the storage.

FIG. 4 is a conceptual diagram of an example when a running road R is divided into a plurality of sections. In FIG. 4, (a) is a diagram of section IDs assigned in accordance with sectionalization reflecting the road surface gradient θ etc., and (b) is a diagram of a data table of the charged capacity change amount ΔSOC for each section stored in the memory portion 101. As depicted in FIG. 4, in addition to the sectionalization at branch points based on the intersection information stored in the storage medium 92, sections are divided at division points set depending on a change in the road surface gradient θ. A section ID is determined for each of a plurality of the divided sections and the charged capacity change amount ΔSOC is stored for each of the section IDs.

A running route acquiring portion, i.e., a running route acquiring means 110 acquires all the possibly-traveled running routes within a predetermined distance from the current position of the vehicle 10 from the map data stored in the storage medium 92. For example, based on the current position information and the vehicle traveling direction information of the vehicle 10, the running route acquiring means 110 acquires the running routes increasing in a branched manner at branch points present on a running road in the traveling direction from the current position of the vehicle 10 (i.e., branch points based on the intersection information stored in the storage medium 92). For example, the predetermined distance may be a sufficient fixed distance obtained in advance for acquiring the fuel efficiency effect in consideration of the preliminary consumption of the charged capacity SOC of the electric storage device 54 by the EV running and the assist running as described above. Alternatively, for example, the predetermined distance may be a distance giving rise to at least one running route causing the running state in which the regenerative energy is partially unrecoverable and discarded, out of the running routes continuously acquired by the running route acquiring means 110.

The acquisition of all the running routes branched at the branch points increases a calculation load and also leads to increased calculation loads in various calculations described later based on the acquired running routes. Therefore, the running route acquiring means 110 acquires the possibly-traveled running routes excluding a branch destination with road information such as a road type (road attribute) and road width information having a difference equal to or greater than a predetermined amount from a branch source, a branch destination having running history of the past (past running history) equal to or less than a predetermined amount, and/or a branch destination in a direction taken in the case of traveling to the branch destination causing a difference equal to or greater than a predetermined amount from the current vehicle traveling direction.

For example, the running route acquiring means 110 compares the road information between a branch source and a branch destination to determine whether the road information has a difference equal to or greater than a predetermined amount, and if the road information has a difference equal to or greater than the predetermined amount, the branch destination is excluded from route candidates and is not acquired as a possibly-traveled running route. Having a difference equal to or greater than the predetermined amount means the presence of a predetermined road type difference or a predetermined road width difference equal to or greater than a difference set in advance for a branch destination less likely to be traveled relative to a branch source, for example. The predetermined road type difference may exist when a branch destination is a minor street etc., while a branch source is a national road or a prefectural road, for example.

Figures 4A, 4B:
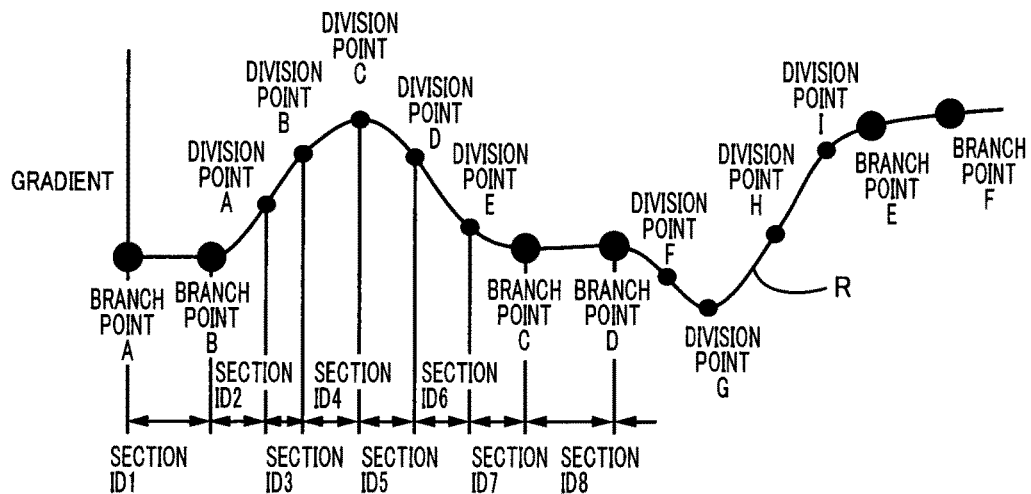
FIG. 4 is a conceptual diagram of an example when a running road is divided into a plurality of sections.

The running route acquiring means 110 determines whether the past running history of a branch destination is equal to or less than a predetermined amount, and if the past running history is equal to or less than the predetermined amount, the branch destination is excluded from route candidates and is not acquired as a possibly-traveled running route. Being equal to or less than the predetermined amount means being equal to or less than predetermined past running history set in advance for a branch destination less likely to be traveled, for example. The past running history is stored in the memory portion 101 as the number of times of running in connection with section ID as depicted in FIG. 4(b), for example, and the number of times of running of a running road is incremented by the diverse information acquiring means 106 each time the running road is traveled. If the section IDs are differentiated by the division points as described above, the past running histories are the same for section IDs between a branch point at which a branch destination exists and the next branch point.

The running route acquiring means 110 determines whether a direction taken in the case of traveling to a branch destination has a difference equal to or greater than a predetermined amount from the current vehicle traveling direction, and if the direction has a difference equal to or greater than the predetermined amount, the branch destination is excluded from route candidates and is not acquired as a possibly-traveled running route. Having a difference equal to or greater than the predetermined amount means the presence of a predetermined traveling direction difference equal to or greater than a difference set in advance for a branch destination less likely to be traveled relative to a branch source, for example. The predetermined traveling direction difference may exist when the traveling direction of the branch destination has a difference of $\pm 2\pi/3\pi$ or more relative to the traveling direction of the branch source, for example.

A per-route SOC calculating portion, i.e., a per-route SOC calculating means 112 calculates a variation characteristic of the charged capacity SOC in correlation with a distance from the current position for each of the possibly-traveled running routes acquired by the running route acquiring means 110 based on the charged capacity change amount ΔSOC stored for each of the section IDs. The variation characteristic of the charged capacity SOC is a characteristic acquired by calculating a change in cumulative value of the charged capacity change amount ΔSOC in the acquired running route relative to the current charged capacity SOC by using a distance as a variable.

An SOC recovery availability determining portion, i.e., an SOC recovery availability determining means 114 determines whether the possibly-traveled running routes acquired by the running route acquiring means 110 include at least one running route causing the running state in which the regenerative energy is partially unrecoverable and discarded i.e., at least one running route enabling recovery of electric energy to the extent exceeding the management width upper limit value of the charged capacity SOC, from the variation characteristic of the charged capacity SOC of each running route calculated by the per-route SOC calculating means 112. For the running route having a portion exceeding the management width upper limit value, the SOC recovery availability determining means 114 calculates a position of the exceeding point on the road map and a regenerative energy amount in the exceeding point as an SOC recovery expected amount. Therefore, the SOC recovery availability determining means 114 determines whether the electric energy exceeding the management width upper limit value of the charged capacity SOC is expected to be recovered in at least one of the possibly-traveled running routes.

If the SOC recovery availability determining means 114 determines that the recovery is expected, an SOC failure determining portion, i.e., an SOC failure determining means 116 determines whether the charged capacity SOC lower than the management width lower limit value is avoided in all the possibly-traveled running routes acquired by the running route acquiring means 110 even when the SOC recovery expected amount is consumed before the recovery. Therefore, the SOC failure determining means 116 determines whether the charged capacity SOC lower than the management width lower limit value is avoided and electric failure is prevented even when the SOC recovery expected amount is consumed in advance in the other running routes other than the recovery-expected running route determined by the SOC recovery availability determining means 114.

If the SOC failure determining means 116 determines that electric failure is prevented, the hybrid control means 104 permits the EV running or the assist running using a consumable amount based on the SOC recovery expected amount (i.e., the EV running or the assist running consuming the consumable amount). The hybrid control means 104 performs the EV running or the assist running such that the consumable amount is consumed before the start of recovery of electric energy. Since the SOC failure determining means 116 determines that electric failure is prevented, the consumable amount is basically the SOC recovery expected amount, for example; however, the consumable amount may be lower one of the SOC recovery expected amount and (the current charged capacity SOC—the management width lower limit) in consideration of an calculation error, variation, etc.

Figure 6:
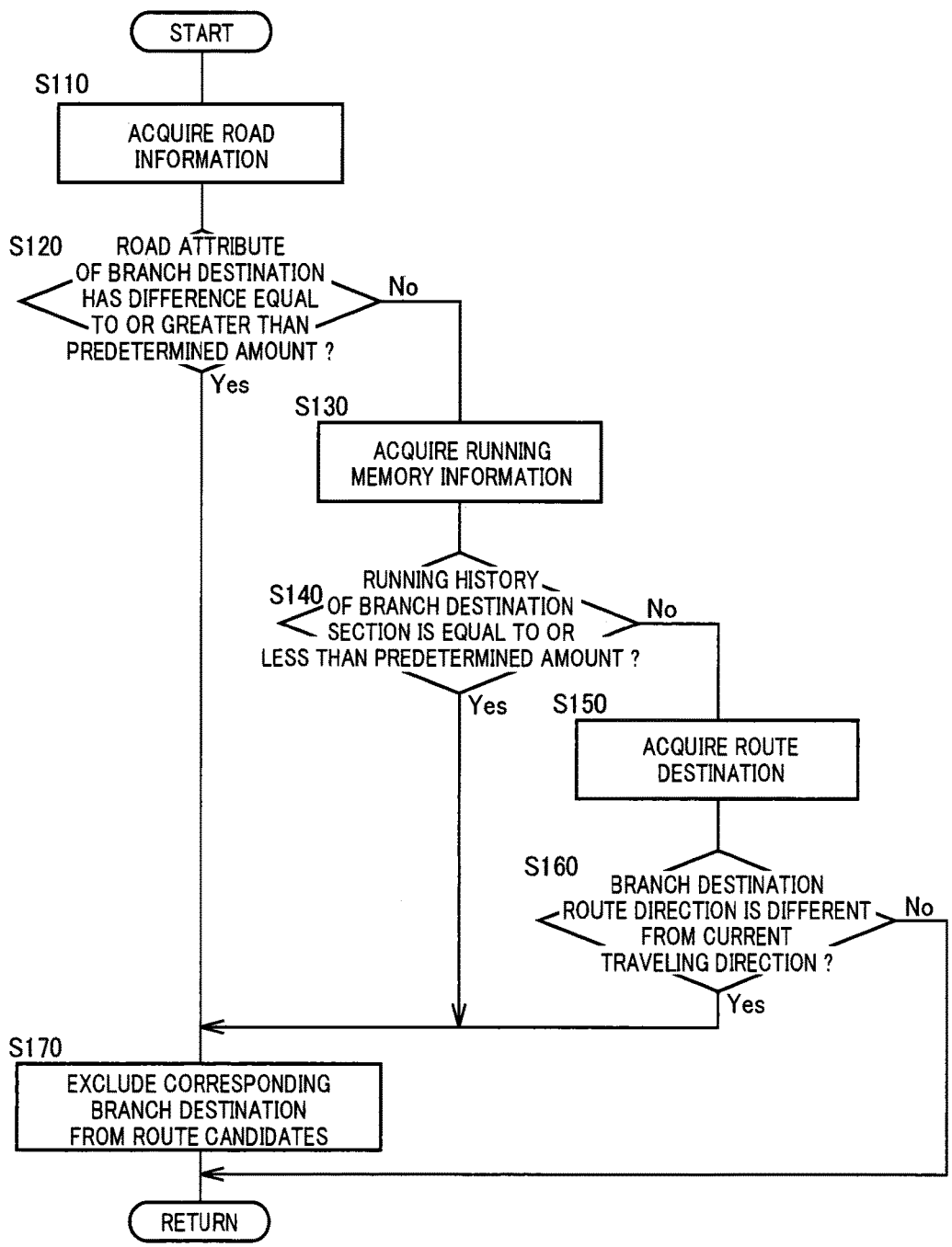
FIG. 6 is a supplementary flowchart executed when the control operation described in the flowchart of FIG. 5 is executed.
Figure 7:
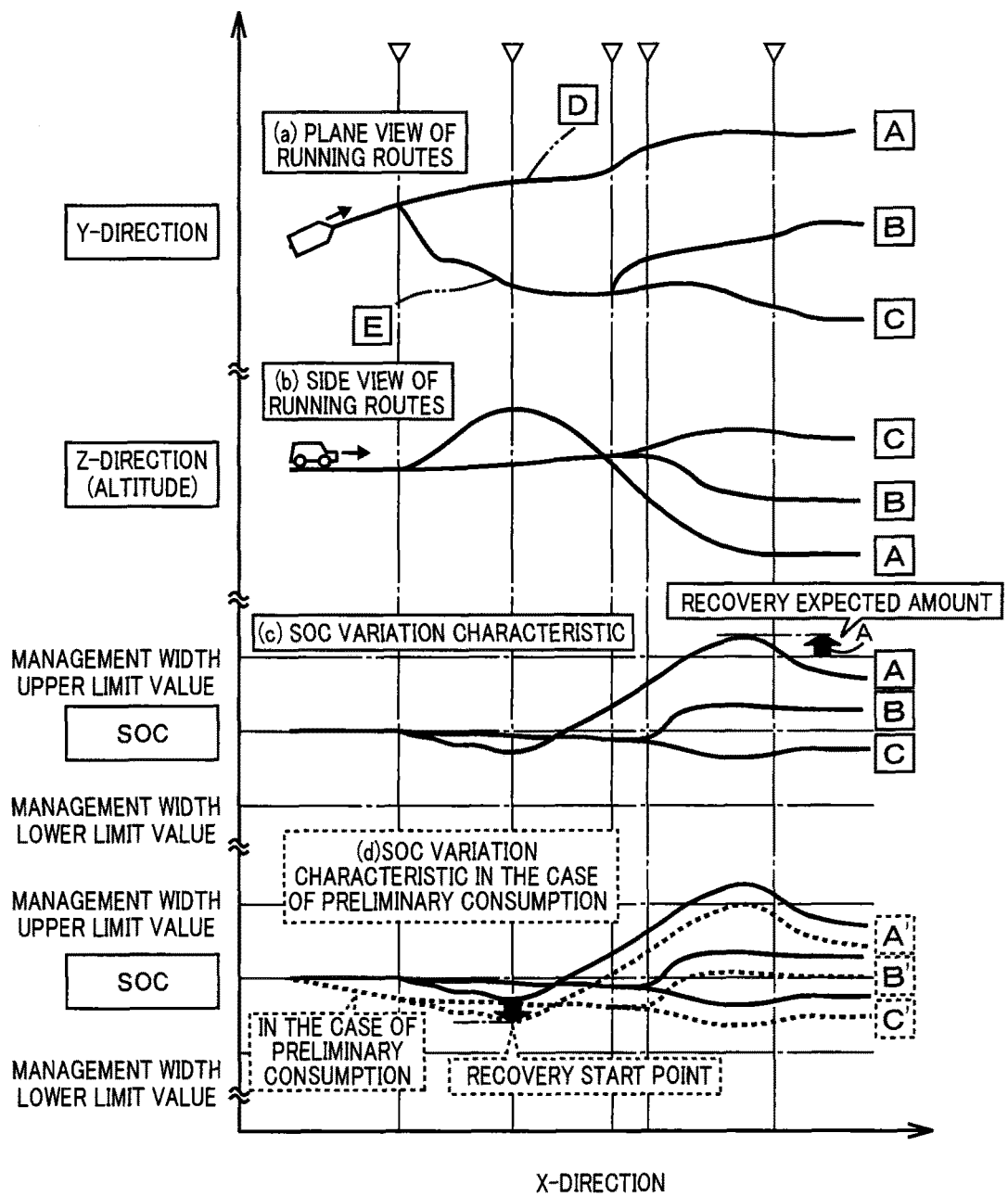
FIG. 7 is a conceptual diagram of an example when the control operation described in the flowchart of FIG. 5 is executed.

FIG. 5 is a flowchart for explaining a main portion of the control operation of the electronic control device 100, i.e., a control operation for enabling the EV running and the assist running causing no electric failure without specifying one running route so as to improve fuel efficiency, and is repeatedly executed with an extremely short cycle time, for example, on the order of a few msec to a few tens of msec. FIG. 6 is a supplementary flowchart executed when the control operation described in the flowchart of FIG. 5 is executed. FIG. 7 is a conceptual diagram of an example when the control operation described in the flowchart of FIG. 5 is executed.

In FIG. 5, first, at step (hereinafter, step will be omitted) S10 corresponding to the running route acquiring means 110, for example, all the possibly-traveled running routes are acquired within a predetermined distance from the current position of the vehicle 10 from the map data stored in the storage medium 92. In this case, the flowchart of FIG. 6 is executed to exclude a branch destination with road information such as a road type and road width information having a difference equal to or greater than a predetermined amount from a branch source, a branch destination with past running history equal to or less than a predetermined amount, and a branch destination in a direction taken in the case of traveling to the branch destination causing a difference equal to or greater than a predetermined amount from the current vehicle traveling direction. Specifically, in FIG. 6, first, at S110, the road information such as a road type and road width information of a running road corresponding to a branch destination is acquired from the map data stored in the storage medium 92. At S120, it is determined whether the road information of the branch destination has a difference equal to or greater than a predetermined amount from the road information of the branch source. If the determination of S120 is negative, at S130, the number of times of running of the running road (section) corresponding to the branch destination is acquired from the data stored in the memory portion 101. At S140, it is determined whether the past running history of the branch destination is equal to or less than a predetermined amount. If the determination of S140 is negative, at S150, a direction taken in the case of traveling to the running road corresponding to the branch destination is acquired from the map data stored in the storage medium 92. At S160, it is determined whether the direction taken in the case of traveling to the branch destination has a difference equal to or greater than a predetermined amount from the current vehicle travelling direction. If the determination of S160 is negative, this routine is terminated. On the other hand, if any one of S120, S140, and S160 is affirmative, at S170, the affirmed branch destination is excluded from the candidates of the possibly-traveled running routes acquired at S10 of the flowchart of FIG. 5. Each of running routes A, B, and C (solid lines) depicted in FIGS. 7(a) and 7(b) is an example of the possibly-traveled running routes acquired at S10. A running route D (dashed-two dotted line) depicted in FIG. 7(a) is an example of the branch destination excluded from the possibly-traveled running routes because the road information has a difference equal to or greater than the predetermined amount from the branch source. A running route E (dashed-two dotted line) depicted in FIG. 7(a) is an example of the branch destination excluded from the possibly-traveled running routes because a direction taken in the case of traveling has a difference equal to or greater than a predetermined amount from the current vehicle travelling direction. Each of steps S110 to S170 of the flowchart of FIG. 6 corresponds to the running route acquiring means 110.

Returning to FIG. 5, after S10, at S20 corresponding to the per-route SOC calculating means 112, a variation characteristic of the charged capacity SOC is calculated in correlation with a distance from the current position for each of the possibly-traveled running routes based on the charged capacity change amount ΔSOC stored for each of the section IDs in the possibly-traveled running routes acquired at S10 (see SOC variation characteristics of FIG. 7(c)). At S30 corresponding to the SOC recovery availability determining means 114, it is determined whether the electric energy exceeding the management width upper limit value of the charged capacity SOC is expected to be recovered in at least one of the possibly-traveled running routes acquired at S10. If the electric energy exceeding the management width upper limit value is expected to be recovered, a position of the portion exceeding the management width upper limit value in the running route and an SOC recovery expected amount are calculated. In FIG. 7(c), a portion of an arrow A is a discarded portion, i.e., a portion that is not recovered as regenerated energy and, if this portion exists, the running route A is determined as being "recovery-expected". If the determination of S30 is negative, this routine is terminated and, if affirmative, at S40 corresponding to the SOC failure determining means 116, for example, it is determined whether the charged capacity SOC lower than the management width lower limit value is avoided and electric failure is prevented in the other running routes other than the running route considered as being recovery-expected even when the SOC recovery expected amount is consumed before the recovery (in advance). In FIG. 7(c), if the running route A is determined as being "recovery-expected", attention is focused on the other running routes B and C to determine whether electric failure is prevented in the running routes B and C when the SOC recovery expected amount is consumed in advance (before a recovery start point). Running routes B' and C' (broken lines) of FIG. 7(d) correspond to the case of consuming the SOC recovery expected amount in advance and, in this case, the charged capacity SOC is not lower than the management width lower limit value, resulting in the determination that "electric failure is prevented". If the determination of S40 is negative, this routine is terminated and, if affirmative, at S50 corresponding to the hybrid control means 104, the EV running or the assist running is permitted so as to consume the consumable amount based on the SOC recovery expected amount before a point of starting the SOC recovery (recovery of electric energy). In actual charge/discharge control for the electric storage device 54, for example, a target value of control of the charged capacity SOC may be changed from the median value of the SOC management width to the "current charged capacity SOC—consumable amount" for allowing the EV running or the assist running. Alternatively, the EV running or the assist running may be allowed at the timing enabling the consumption of the consumable amount obtained by back calculation from a typical consumption rate (discharging rate) during the EV running or the assist running.

As described above, according to this example, since a running road acquired from the map data stored in the storage medium 92 is divided into a plurality of sections and the charged capacity change amount ΔSOC of the electric storage device 54 is stored for each of the divided sections, an electric energy amount of the electric storage device 54 consumable before recovery of electric energy can be calculated during running in a certain running route based on the stored charged capacity change amount ΔSOC. By consuming the electric energy amount in advance through the EV running and the assist running, a subsequently recovered electric energy amount (regenerative energy amount) can be increased. As a result, the EV running and the assist running causing no electric failure can be achieved without specifying one running route so as to improve fuel efficiency.

According to this example, all the possibly-traveled running routes are acquired within a predetermined distance from the current position of the vehicle 10 based on the map data; a variation characteristic of the charged capacity SOC is calculated in correlation with a distance from the current position for each of the running routes based on the charged capacity change amount ΔSOC; if it is determined from the variation characteristic of the charged capacity SOC that the possibly-traveled running routes include at least one running route in which the electric energy can be recovered to the extent exceeding the management width upper limit value of the charged capacity SOC and that, even if the electric energy exceeding the management width upper limit value is consumed before the recovery, the charged capacity SOC lower than the management width lower limit value is avoided in all the possibly-traveled running routes, the EV running or the assist running using the consumable amount based on the electric energy exceeding the management width upper limit value is permitted; and, therefore, a subsequently recovered regenerative energy amount can be increased by consuming the electric energy amount in advance through the EV running and the assist running. As a result, the EV running and the assist running causing no electric failure can be achieved without specifying one running route so as to improve fuel efficiency.

According to this example, since the sections are divided based on a branch point at which a branched road of the running road exists, the running road acquired from the map data is appropriately divided into a plurality of sections. Since the sections are divided depending on a change amount of the road surface gradient θ and a change amount of altitude H based on the road surface gradient and the altitude information in the map data, the running road acquired from the map data is more appropriately divided into a plurality of sections.

According to this example, since the possibly-traveled running routes are acquired excluding a branch destination of a road type having a difference equal to or greater than a predetermined amount from a branch source, a branch destination with past running history equal to or less than a predetermined amount, and a branch destination in a direction taken in the case of traveling to the branch destination causing a difference equal to or greater than a predetermined amount from the current vehicle traveling direction, all the possibly-traveled running routes can be included while excluding from candidates a running route having a low probability of running determined from a road type of a branched road ahead, a running route having a low probability of running determined from past running history, and a running route in a direction that is not an approximate traveling direction, and a calculation load can be reduced when the possibly-traveled running routes are acquired, when a variation characteristic of the charged capacity SOC is subsequently calculated, and when determinations are made in relation to the determination on whether the EV running or the assist running using the consumable amount is permitted.

Other examples of the present invention will be described. In the following description, the portions common to the examples are denoted by the same reference numerals and will not be described.

SECOND EXAMPLE

During the EV running or the assist running under the permission for the EV running or the assist running consuming the consumable amount performed in the first example, if the charged capacity SOC falls below the management width lower limit value thereof due to variations of running status etc., a forcible charging mode is entered to forcibly charge the electric storage device 54 and the fuel efficiency may deteriorate. On the other hand, during the running under the permission for the EV running or the assist running, the running route essentially has a sufficient probability of subsequent recovery of electric energy. Therefore, in this example, to restrain the forcible charging mode from being entered, if the actual charged capacity SOC of the electric storage device 54 is close to and within a predetermined capacity difference from the management width lower limit value during the EV running or the assist running under the permission for the EV running or the assist running consuming the consumable amount, the management width lower limit value is temporarily made smaller on the condition that the charged capacity SOC subsequently increases in the currently traveling running route.

Figure 8:
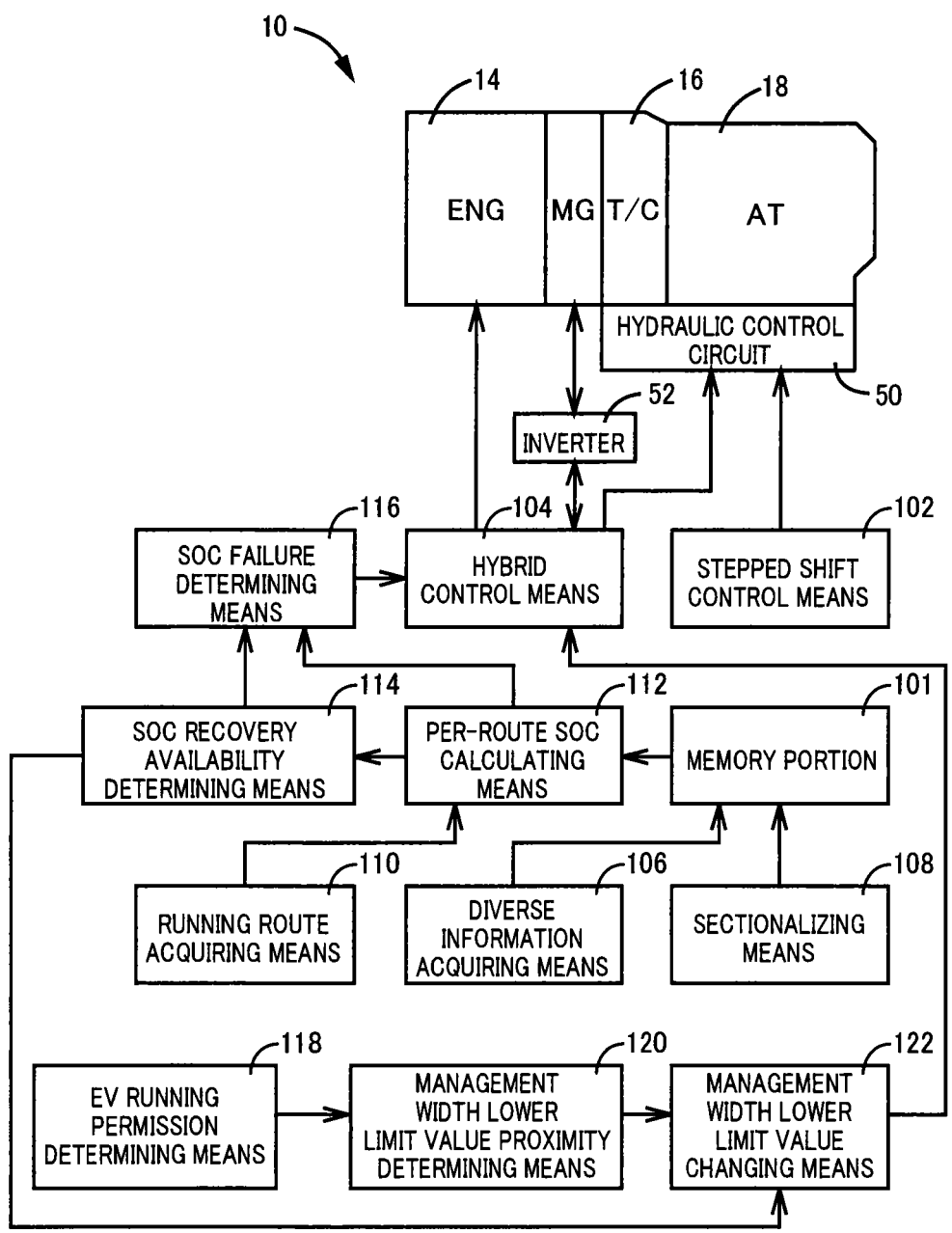
FIG. 8 is a functional block diagram for explaining a main portion of the control function of the electronic control device and depicts an example different from FIG. 3 acquired by adding new functions to the functional block diagram of FIG. 3.

Specifically, FIG. 8 is a functional block diagram for explaining a main portion of the control function of the electronic control device 100 and depicts an example different from FIG. 3 acquired by adding new functions to the functional block diagram of FIG. 3. In FIG. 8, an EV running permission determining portion, i.e., an EV running permission determining means 118 determines whether the EV running or the assist running is being performed under the permission for the EV running or the assist running consuming the consumable amount.

If the EV running permission determining means 118 determines that the EV running or the assist running is being performed, a management width lower limit value proximity determining portion, i.e., a management width lower limit value proximity determining means 120 determines whether the current charged capacity SOC is close to and within a predetermined capacity difference from the management width lower limit value. This predetermined capacity difference is a determination threshold value obtained in advance for determining that the proximity to the management width lower limit value and may be a predetermined fixed value or a variable value (=gain×d) corresponding to a distance d between an SOC recovery start point calculated from a predetermined calculation equation and the current value. For example, this variable value is made smaller when the distance d is shorter so as to exactly determine a change in the management width lower limit value until just before.

The SOC recovery availability determining means 114 determines whether the charged capacity SOC subsequently increases based on the variation characteristic of the charged capacity SOC in each running route possibly traveled from the currently traveling running route. The determination of whether the charged capacity SOC subsequently increases is changed depending on, for example, how a change amount (reduced amount) of the management width lower limit value is set by a management width lower limit value changing means 122 described later. For example, if the change amount of the management width lower limit value is a minimum value of a subsequent increased amount of the charged capacity SOC, it is directly determined whether the charged capacity SOC subsequently increases. On the other hand, if the change amount of the management width lower limit value is a predetermined fixed value or a variable value corresponding to a distance, it is determined whether the charged capacity SOC increases by an amount equal to or greater than the change amount of the management width lower limit value.

If the SOC recovery availability determining means 114 determines that the charged capacity SOC subsequently increases, a management width lower limit value changing portion, i.e., the management width lower limit value changing means 122 temporarily changes (reduces) the management width lower limit value. As described above, the change amount of the management width lower limit value may be, for example, a minimum value of a subsequent increased amount of the charged capacity SOC, a predetermined fixed value obtained in advance, or a variable value (=gain×d) corresponding to the distance d between the SOC recovery start point calculated from a predetermined calculation equation obtained in advance and the current value. For example, this variable value may be made larger when the distance d is longer to prevent the forcible charging mode from being easily entered.

Figure 9:
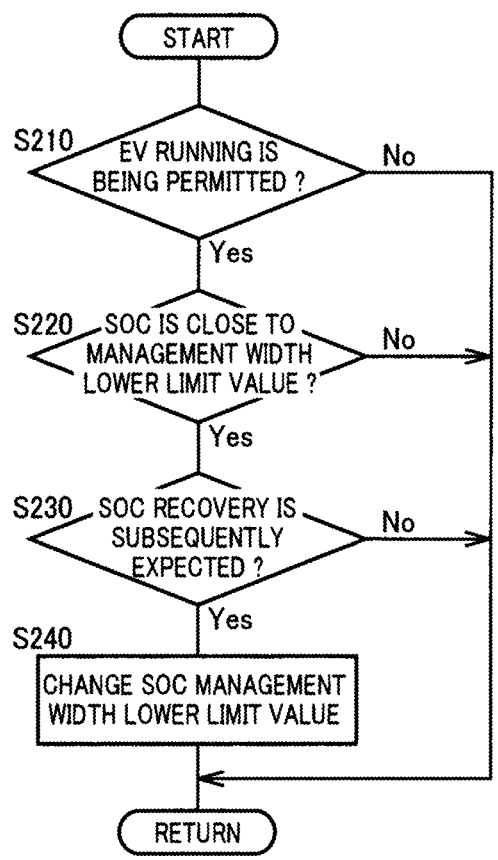
FIG. 9 is a flowchart for explaining a main portion of the control operation of the electronic control device, i.e., a control operation for preventing the forcible charging mode from being easily entered so as to improve fuel efficiency.

FIG. 9 is a flowchart for explaining a main portion of the control operation of the electronic control device 100, i.e., a control operation for preventing the forcible charging mode from being easily entered so as to improve fuel efficiency, and is repeatedly executed with an extremely short cycle time, for example, on the order of a few msec to a few tens of msec.

In FIG. 9, first, at S210 corresponding to the EV running permission determining means 118, for example, it is determined whether the EV running or the assist running is being performed under the permission for the EV running or the assist running consuming the consumable amount. If the determination of S210 is negative, this routine is terminated and, if affirmative, at S220 corresponding to the management width lower limit value proximity determining means 120, for example, it is determined whether the current charged capacity SOC is close to and within a predetermined capacity difference from the management width lower limit value. If the determination of S220 is negative, this routine is terminated and, if affirmative, at S230 corresponding to the SOC recovery availability determining means 114, for example, it is determined whether the charged capacity SOC subsequently increases based on the variation characteristic of the charged capacity SOC in each running route possibly traveled from the currently traveling running route. If the determination of S230 is negative, this routine is terminated and, if affirmative, at S240 corresponding to the management width lower limit value changing means 122, for example, the management width lower limit value is temporarily changed (reduced).

As described above, according to this example, in addition to the effects of the example, if the actual charged capacity SOC of the electric storage device 54 is close to and within a predetermined capacity difference from the management width lower limit value during the EV running or the assist running under the permission for the EV running or the assist running using the consumable amount, the management width lower limit value is temporarily made smaller on the condition that the charged capacity SOC subsequently increases in the currently traveling running route and, therefore, the EV running or the assist running is continued and the fuel efficiency can be improved by the subsequent recover of electric energy.

THIRD EXAMPLE

During the EV running or the assist running under the permission for the EV running or the assist running consuming the consumable amount performed in the first example, if a deviation occurs from the possibly-traveled running routes acquired by the running route acquiring means 110, i.e., if the running is performed on a running road other than the possibly-traveled running routes after the permission for the EV running or the assist running, the charged capacity SOC of the electric storage device 54 may fall below the management width lower limit value because the electric energy amount is consumed in advance by the EV running or the assist running. Therefore, in this example, the permission for the EV running or the assist running is withdrawn to avoid electric failure if the running is performed in a route other than the possibly-traveled running routes. The EV running or the assist running is not permitted until the charged capacity SOC recovers to a normal level (e.g., the median value of the SOC management width).

Figure 10:
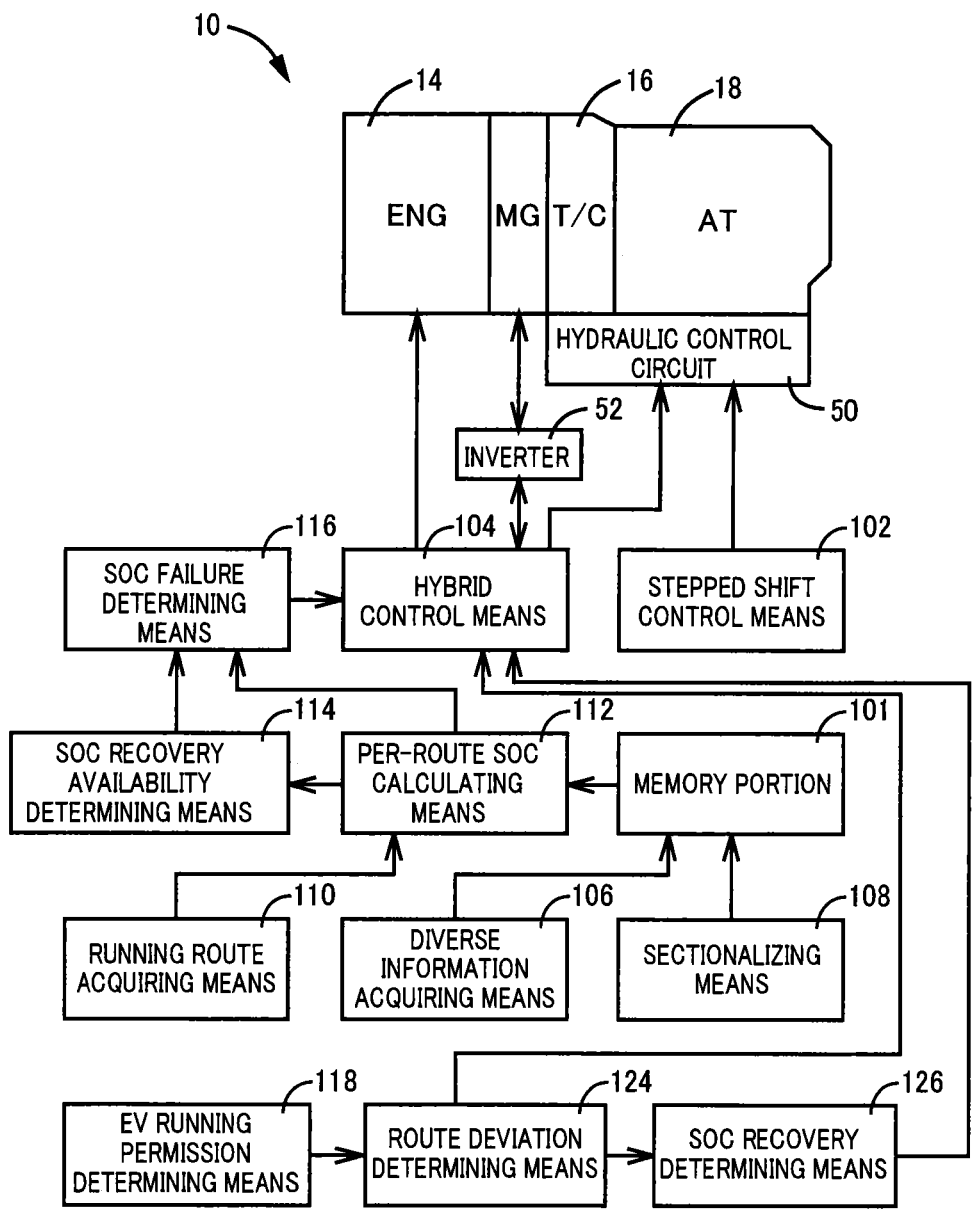
FIG. 10 is a functional block diagram for explaining a main portion of the control function of the electronic control device and depicts an example different from FIG. 3 acquired by adding new functions to the functional block diagram of FIG. 3.

Specifically, FIG. 10 is a functional block diagram for explaining a main portion of the control function of the electronic control device 100 and depicts an example different from FIG. 3 acquired by adding new functions to the functional block diagram of FIG. 3. In FIG. 10, if the EV running permission determining means 118 determines that the EV running or the assist running is being performed, a route deviation determining portion, i.e., a route deviation determining means 124 determines whether a deviation occurs from the possibly-traveled running routes acquired by the running route acquiring means 110 based on the current position information of the vehicle 10.

The hybrid control means 104 withdraws the permission for the EV running or the assist running consuming the consumable amount and provides normal control except the control of the EV running or the assist running consuming the consumable amount. Once withdrawing the permission for the EV running or the assist running consuming the consumable amount, the hybrid control means 104 does not permit the EV running or the assist running consuming the consumable amount until an SOC recovery determining means 126 described later determines that the charged capacity SOC recovers to a normal level.

An SOC recovery determining portion, i.e., the SOC recovery determining means 126 determines whether the charged capacity SOC recovers to the normal level (e.g., the median value of the SOC management width) in the normal control.

FIG. 11 is a flowchart for explaining a main portion of the control operation of the electronic control device 100, i.e., a control operation for avoiding electric failure when electric energy cannot be recovered as expected, and is repeatedly executed with an extremely short cycle time, for example, on the order of a few msec to a few tens of msec.

In FIG. 11, first, at S310 corresponding to the EV running permission determining means 118, for example, it is determined whether the EV running or the assist running is being performed under the permission for the EV running or the assist running consuming the consumable amount. If the determination of S310 is negative, this routine is terminated and, if affirmative, at S320 corresponding to the route deviation determining means 124, for example, it is determined whether a deviation occurs from the acquired possibly-traveled running routes based on the current position information of the vehicle 10. If the determination of S320 is negative, this routine is terminated and, if affirmative, at S330 corresponding to the hybrid control means 104, for example, the permission for the EV running or the assist running consuming the consumable amount is withdrawn and the normal control is provided. At S340 corresponding to the SOC recovery determining means 126, it is determined whether the charged capacity SOC recovers to the normal level (e.g., the median value of the SOC management width) in the normal control. If the determination of S340 is affirmative, this routine is terminated and, if negative, at S350 corresponding to the hybrid control means 104, the EV running or the assist running consuming the consumable amount is not permitted. S340 is then executed again. Therefore, until the determination of S340 is affirmed, the EV running or the assist running consuming the consumable amount is not permitted at S350.

As described above, according to this example, in addition to the effects of the example, if the running is performed in a route other than the possibly-traveled running routes, the permission for the EV running or the assist running is withdrawn and, therefore, electric failure is avoided even if the expected regenerative energy amount becomes unable to be recovered. As a result, appropriate running can be continued.

Although the examples of the present invention have been described in detail with reference to the drawings, the present invention can be implemented by combining the examples with each other and is applied in other forms.

For example, although the examples are implemented independently of each other in the examples, the examples may not necessarily independently be implemented and may be implemented in a combined manner as needed.

Additionally to the forms in the examples, the possibly-traveled running routes may be made up of sections with the charged capacity change amount ΔSOC stored. As a result, the variation characteristic of the charged capacity SOC is appropriately calculated for each of the possibly-traveled running routes to appropriately determine from the variation characteristic of the charged capacity SOC whether the possibly-traveled running routes include at least one running route in which the electric energy can be recovered to the extent exceeding the management width upper limit value of the charged capacity SOC and to appropriately determine from the variation characteristic of the charged capacity SOC whether the charged capacity SOC lower than the management width lower limit value is avoided in all the possibly-traveled running routes even if the electric energy exceeding the management width upper limit value is consumed before the recovery.

From another viewpoint, when the possibly-traveled running routes may be made up of sections with the charged capacity change amount ΔSOC stored, if the running is consequently performed in a section other than the sections with the charged capacity change amount ΔSOC stored, the permission for the EV running or the assist running is withdrawn.

Although the charged capacity change amount ΔSOC in a certain section is acquired as an actual measurement value based on the charged capacity SOC in the examples, this is not a limitation. For example, an integrated value of running energy (=(potential energy mgh+running resistance Cd×projected area A×vehicle speed $V^2$+rolling resistance)×charge efficiency η, where m is vehicle weight; g is gravitational acceleration; and h is difference in elevation) in a certain section may be calculated as the charged capacity change amount ΔSOC. Therefore, an estimated charged capacity change amount ΔSOC of a section without past running history and the charged capacity change amount ΔSOC stored may be calculated as an integrated value of the running energy. However, since the vehicle speed V is necessary for the calculation of the running energy, for example, the legal speed or other similar average vehicle speed of a road type in the section is used as the vehicle speed V.

Although the three determination conditions for excluding the branch destinations (steps S120, S140, and S160) are the OR conditions in the flowchart of FIG. 6 in the examples, the conditions may be the AND conditions.

Although the permission for the EV running or the assist running is withdrawn if the running is performed in a route other than the possibly-traveled running routes in the third embodiments, this is not a limitation and, for example, if electric energy cannot be recovered as expected for some reason, the permission for the EV running or the assist running may be withdrawn. Even in this case, electric failure is appropriately avoided.

The above description is merely an embodiment and the present invention may be implemented in variously modified and improved forms based on the knowledge of those skilled in the art.

NOMENCLATURE OF ELEMENTS

10: hybrid vehicle 14: engine (drive power source for running) 54: electric storage device 100: electronic control device (control device) MG: electric motor (drive power source for running)

The invention claimed is:

1. A control device of a hybrid vehicle including a plurality of drive power sources for running including an electric motor driven by electric energy of an electric storage device, the hybrid vehicle configured to perform motor running or assist running using the electric motor for running, the control device being configured to divide a running road acquired from map data into a plurality of sections and stores a change amount of a charged capacity of the electric storage device for each of the divided sections, to acquire all possibly-traveled running routes within a predetermined distance from a current position of the vehicle based on the map data, the acquired possibly-traveled running routes excluding at least one of branch destinations including a first branch destination with road information having a difference equal to or greater than a predetermined amount from a branch source, a second branch destination having past running history equal to or less than a predetermined amount, and a third branch destination in a direction taken in a case of traveling to the third branch destination causing a difference equal to or greater than a predetermined amount from a current vehicle traveling direction, to calculate a variation characteristic of the charged capacity in correlation with a distance from the current position for each of the running routes based on the change amount of the charged capacity, when it is determined from the variation characteristic of the charged capacity that the possibly-traveled running routes include at least one running route in which electric energy can be recovered to the extent exceeding a predetermined charged capacity upper limit value for permitting charging of the electric storage device, to determine whether the charged capacity does not fall below a predetermined charged capacity lower limit value for permitting discharging of the electric storage device in any of the possibly-traveled running routes even if electric energy exceeding the predetermined charged capacity upper limit value is consumed before recovery, such that the determination as to whether the charged capacity does not fall below the predetermined charged capacity lower limit value in any of the possibly-traveled running routes, is made prior to actual running of the hybrid vehicle along a selected one of the possibly-traveled running routes, when it is determined that the charged capacity does not fall below the predetermined charged capacity lower limit value in any of the possibly-traveled running routes even if the electric energy exceeding the predetermined charged capacity upper limit value is consumed before the recovery, to give permission for the motor running or the assist running using a consumable amount of the electric energy based on the electric energy exceeding the predetermined charged capacity upper limit value.

2. The control device of a hybrid vehicle of claim 1, wherein
when running is performed in a route other than the possibly-traveled running routes, the permission for the motor running or the assist running is withdrawn.

3. The control device of a hybrid vehicle of claim 1, wherein the possibly-traveled running routes are made up of sections with a change amount of the charged capacity stored.

4. The control device of a hybrid vehicle of claim 1, wherein the sections are divided based on a branch point at which a branched road of a running road starts.

5. The control device of a hybrid vehicle of claim 1,
wherein the control device is configured to determine whether the charged capacity does not fall below the predetermined charged capacity lower limit value even if the electric energy exceeding the predetermined charged capacity upper limit value is consumed before recovery, in each of the at least one running route in which the electric energy can be recovered to the extent exceeding the predetermined charged capacity upper limit value,
wherein the control device is configured to determine whether the charged capacity does not fall below the predetermined charged capacity lower limit value even if the electric energy exceeding the predetermined charged capacity upper limit value is consumed before recovery, in each of the other of the possibly-traveled running routes in which the electric energy is not be recovered to the extent exceeding the predetermined charged capacity upper limit value, and
wherein the control device is configured to determine that the charged capacity does not fall below the predetermined charged capacity lower limit value in any of the possibly-traveled running routes, when it is determined that the charged capacity does not fall below the predetermined charged capacity lower limit value not only in each of the at least one running route but also in each of the other of the possibly-traveled running routes.

6. The control device of a hybrid vehicle of claim 1,
wherein the control device is configured to determine whether the charged capacity does not fall below the predetermined charged capacity lower limit value even if the electric energy exceeding the predetermined charged capacity upper limit value is consumed before recovery, in one of the possibly-traveled running routes that is to be selected as an actual running route through which the vehicle actually runs,
wherein the control device is configured to determine whether the charged capacity does not fall below the predetermined charged capacity lower limit value even if the electric energy exceeding the predetermined charged capacity upper limit value is consumed before recovery, in each of the other of the possibly-traveled running routes through which the vehicle does not actually runs, and
wherein the control device is configured to determine that the charged capacity does not fall below the predetermined charged capacity lower limit value in any of the possibly-traveled running routes, when it is determined that the charged capacity does not fall below the predetermined charged capacity lower limit value not only in the one of the possibly-traveled running routes but also in each of the other of the possibly-traveled running routes.

7. The control device of a hybrid vehicle of claim 1, wherein the determination as to whether the charged capacity does not fall below the predetermined charged capacity lower limit value in any of the possibly-traveled running routes, is made prior to selection of one of the possibly-traveled running routes that is to be selected as an actual running route through which the vehicle actually runs.

* * * * *